United States Patent [19]

Toyoshima

[11] 4,441,111

[45] Apr. 3, 1984

[54] METHOD AND APPARATUS FOR APPLYING SIGNAL VOLTAGES TO ELECTROSTATIC RECORDING MULTI-STYLUS ELECTRODE ASSEMBLY

[75] Inventor: Toshihiko Toyoshima, Kanagawa, Japan

[73] Assignee: Fuji Xerox Co., Ltd., Tokyo, Japan

[21] Appl. No.: 345,901

[22] Filed: Feb. 4, 1982

[30] Foreign Application Priority Data

Apr. 14, 1981 [JP] Japan ................... 56-55061

[51] Int. Cl.³ ............................................ G01D 15/06
[52] U.S. Cl. .................................................... 346/154
[58] Field of Search ............................ 346/154, 153.1; 358/298–300; 369/47

[56] References Cited

U.S. PATENT DOCUMENTS 3,792,495 2/1974 Bliss et al. ........................... 346/154

Primary Examiner—Thomas H. Tarcza
Attorney, Agent, or Firm—Sughrue, Mion, Zinn, Macpeak & Seas

[57] ABSTRACT

A method and apparatus for applying signal voltages to an electrostatic recording multi-stylus electrode device composed of main electrodes and control electrodes. A decoder detects the presence or absence of a single "black" bit or dot signal within an input video signal. If multiple "black" bits are present or if no "black" bits are present, a normal control voltage is applied to the control electrodes. Otherwise, if a single "black" bit is detected, a voltage higher than the normal control voltage is applied to the control electrodes. By so doing, the occurrence of missing single "black" dots is substantially eliminated.

6 Claims, 8 Drawing Figures

| BLACK SIGNAL DETECTION DECODER OUTPUT | OUTPUT OF DC SOURCE |
|---|---|
| 1 | $-(E_c + \Delta E)$ |
| 0 | $-E_c$ |

METHOD AND APPARATUS FOR APPLYING SIGNAL VOLTAGES TO ELECTROSTATIC RECORDING MULTI-STYLUS ELECTRODE ASSEMBLY

BACKGROUND OF THE INVENTION

The present invention relates to methods of applying signal voltages to an electrostatic recording multiple electrode assembly. More particularly, the invention relates to a method of applying signal voltages to an electrostatic recording multiple electrode assembly in such a manner as to produce a high quality image which is recorded with a positive discharge and which is free from missing dots.

In general, in an electrostatic recording device, a high voltage video signal is applied to a multiple stylus electrode head to cause the formation of a latent image on an electrostatic recording sheet or a recording medium through corona discharge. The latent image thus formed is rendered visible by the application of a developer. Such a device, which has a simple construction, has been extensively employed in facsimile devices and other types of printers. For this type of device, a multi-stylus electrode assembly of the same-plane control type or back-plane control type may be employed. However, for simplification of description, the invention will be described with reference only to a case where a same-plane control type multi-stylus electrode assembly is used.

FIG. 1 is a plan view of a conventional multiple stylus electrode assembly of the same-plane control type. In FIG. 1, reference character F designates a main electrode assembly and G an assembly of control electrodes $S_1$, $S_2$, ... and $S_n$ arranged on both sides of the main electrode assembly F. Lead wires $1c$, $2c$, ... and $nc$ are connected to the control electrodes $S_1$ through $S_n$, respectively, as shown in FIG. 2. The lead wires $1c$ through $nc$ are connected to a high voltage switching circuit which sequentially applies to the lead wire signals from a ring counter or the like. As the switching circuit is operated, the control electrodes $S_1$ through $S_n$ are sequentially activated (turned on); that is, high voltage pulse signals $1c'$, $2c'$ ... and $nc'$ of equal pulse width, as shown in FIG. 3, are applied to the control electrodes.

The main electrode assembly F includes electrodes $1A$, $2A$, ... and $nA$ in an "A" block arranged confronting the conrol electrodes $S_1$, $S_3$, ... and $S_{2n-1}$, respectively, and electrodes $1B$, $2B$, ... and $nB$ in a "B" block arranged confronting the control electrodes $S_2$, $S_4$, ... and $S_{2n}$, respectively. By sequentially activating the high voltage switching circuits connected to the main electrodes in the "A" block and to the main electrodes in the "B" block, high voltages are applied to the main electrodes of the "A" and "B" blocks with timing as shown in FIG. 3.

In the case where a same-plane control type multi-stylus electrode assembly thus constructed is used to form a latent printing image on a recording medium, as shown in FIG. 4, the polarity of a voltage $E_s$ applied to the control electrodes is made opposite to that of a voltage $E_c$ applied to the main electrodes confronting the control electrodes as shown in FIG. 4, so that the potential difference between the control electrodes and the main electrodes is increased. However, with this technique, the printed image configuration tends to vary according to the polarity of the voltage applied to the main electrode, as will be described in further detail below.

As used herein, an operation of applying a positive potential to the control electrodes while a negative potential is applied to the main electrodes will be referred to as "negative discharge", and an operation of applying a negative potential to the control electrodes while a positive potential is applied to the main electrode will be referred to as "positive discharge". With these definitions, the relationships between applied voltages and recorded dot diameters for positive discharge and for negative discharge are as indicated in the graph of FIG. 5 where stylus diameter is plotted as a parameter.

As is apparent from FIG. 5, it is desirable for achieving a high resolution that the difference between the stylus diameter and the printed dot diameter be minimized. For a given stylus diameter, positive discharge is preferable because the dot diameter for positive discharge is smaller.

FIG. 6 indicates the probability of occurrence of a missing dot at a particular point with the number of dots adjacent to that point, which are recorded simultaneously with the dot at that point, as a parameter. The probability K of a dot being missing (that is, the failure to generate a dot which should actually be printed) is in inverse proportion to the number of adjacent dots. When the number of adjacent dots is one, the probability K can be as large as 40%.

What can be inferred from FIGS. 5 and 6 is summarized as follows: Positive discharge is superior to negative discharge in that the former provides a higher resolution. However, positive discharge still suffers from difficulties in that, in the case where the number of printed dots in an area is small, specifically where the printing of dots is discontinued in the main scanning direction and, for instance, only one dot is to be printed in a particular area, the probability of dots being missing is high, and accordingly it is rather difficult to obtain an accurately reproduced image.

Thus, positive discharge is preferable for a high resolution recording operation. However, it is required that an image printed using positive discharge be high in quality, specifically, free from missing dots. Missing dots can be prevented by increasing the applied voltage. However, it is impossible to increase the voltage applied to the main electrodes because corona discharge will occur between the electrodes. If the voltage applied to the control electrodes is increased, recording tends to be effected with a "white" signal; in other words, a so-called "ghost" image is created which degrades the overall image. Especially for an image for which high resolution is required such as a character composed of a single line, it is essential that each dot be printed. In such an image, if dots are missing, the resultant image is extremely low in quality.

Accordingly, an object of the invention is to provide a method of applying signal voltages to an electrostatic recording multi-stylus electrode assembly, in which the above-described difficulties have been eliminated so that a high quality image is recorded which has no missing dots.

SUMMARY OF THE INVENTION

The foregoing object of the invention is achieved by a method in which, when single "black" signals are present in input video signals to a multi-stylus electrode device of the same-plane control type or back-plane control type, a voltage higher than that employed when the normal signals are applied is supplied to control electrodes which correspond to the "black" signals. As utilized herein, "normal signals" means signals which contain video information corresponding either to multiple black dots in succession or the absence of black dots in a group of predetermined size of successive adjacent dots.

DESCRIPTION OF THE PREFERRED EMBODIMENTS

The invention will be described in detail with reference to FIGS. 7 and 8.

Figures 7, 8:
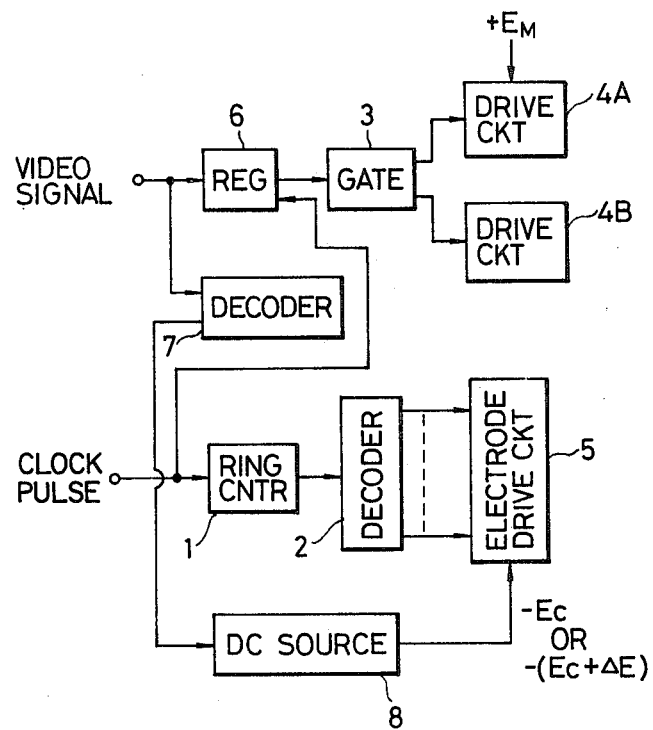
FIG. 7 is a block diagram showing a preferred embodiment of an electrode driving circuit of the invention.
FIG. 8 is a logic table related to the embodiment of the invention.

As shown in FIG. 7, an input circuit for the main electrodes includes a register 6, a gate 3 for distributing signals to a plurality of main electrode blocks, and main electrode drive circuits 4A and 4B for generating activating voltages in response to the distributed signals. On the other hand, an input circuit for the control electrodes includes a "black" signal detecting decoder 7 for detecting single "black" bits in a video signal, a DC source 8 which produces either a normal voltage or a voltage higher than a normal control voltage in response to an output detection signal from the "black" signal detecting decoder 7, a ring counter 1 receiving a clock signal for sequentially scanning a video signal and applying the control voltage to the control electrodes, a decoder for selecting the control electrodes and forming control signals, and a control electrode drive circuit 5 which receives signals from the decoder 2 and either a normal control voltage or a voltage higher than the normal control voltage from the DC source 8 and drives the control electrodes with the received voltage in response to the signals received from the decoder 2.

The operation of the circuitry shown in FIG. 7 will be described. In FIG. 7, the circuit elements designated by reference numerals 1 through 5 are circuits for achieving electrostatic recording which are well known in the art. The decoder 2 operates to produce the control electrode selecting signals as described above. The signals distributed to the main electrodes in A and B blocks are produced by the gate 3. The outputs of the gate 3 are applied to the main electrode drive circuit where high voltage pulses required for causing electrode discharge are produced. The decoder 7 operates to detect single "black" signals in the video signal, in response to which detection the DC source 8 supplies one of two possible outputs to the control electrode drive circuit 5. The decoder 7 is so designed as the provide an output when only one bit is "black" and the remaining bits inputted thereto are "white".

For instance, the decoder 2 can be constructed from a counter which counts the number of "black" bits in a sequence of bits of predetermined length. The counter is reset after the predetermined number of bits has passed. The outputs of the counter are than sensed using simple combinatorial logic to output a logical "1" if a single black bit is present (corresponding to a count of 1) and a logical "0" otherwise (corresponding to a count of other than 1). The combinatorial logic can be implemented by a NOR gate having inputs connected to outputs of the counter other than the least significant bit and an AND gate having a first input coupled to the output of the NOR gate and a second input coupled to the least significant bit output of the counter. The output of the decoder circuit is produced on the output of the AND gate.

The DC source 8 is a two-output source which will produce two stabilized DC outputs $-E_c$ and $-(E_c+\Delta E)$ for logic values as indicated in FIG. 8 where a logic "1" from the decoder 7 indicates a single "black" bit and a logic "0" indicates the contrary case.

SPECIFIC EXAMPLE

Figure 1:
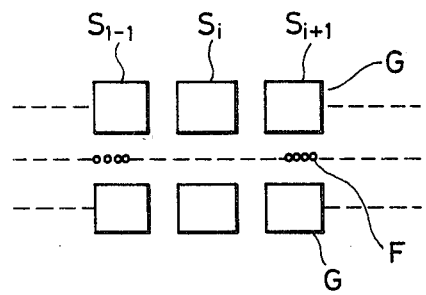
FIG. 1 is a plan view of a multi-stylus electrode assembly of the same plane control type.
Figure 2:
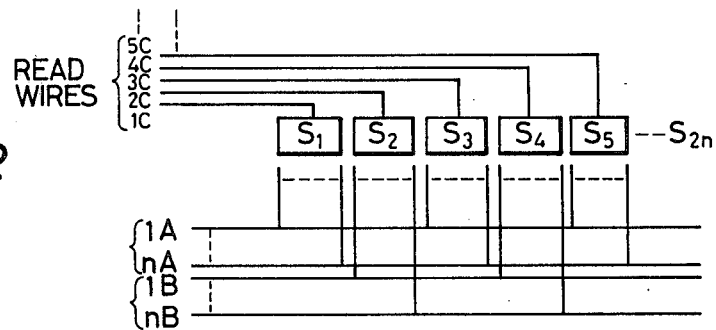
FIG. 2 is an interconnection diagram for the electrodes shown in FIG. 1.
Figure 3:
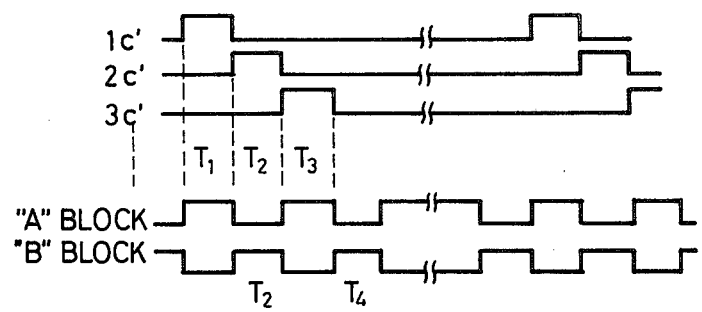
FIG. 3 is a timing chart for a description of voltages applied to the main electrodes and control electrodes in the assembly of FIGS. 1 and 2.
Figure 4:
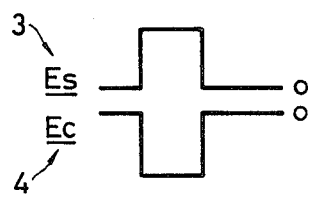
FIG. 4 is a waveform diagram showing the polarities of the voltages applied to the main electrodes and the control electrodes.
Figure 5:
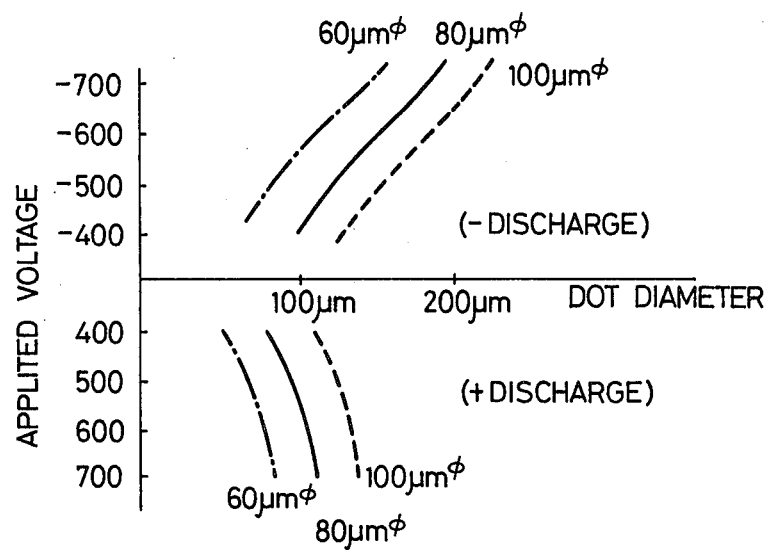
FIG. 5 is a graphical representation showing the relationship between applied voltages and dot diameter for positive discharge and negative discharge.
Figure 6:
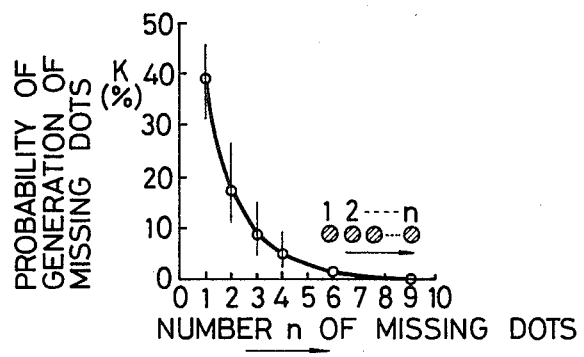
FIG. 6 is a graphical representation indicating the relation between the number (n) of adjacent dots and the probability of occurrence of missing dots.

A multi-stylus electrode assembly as shown in FIGS. 1 and 2 having an electrode density of 8 lines/mm and the circuit shown in FIG. 7 were employed to form an electrostatic latent image on an electrostatic recording medium made up of a recording layer, a low resistance layer and a base layer.

The main electrode voltage was set to $+380$ V, and the control electrode drive voltage was set to $-350$ V in the case of a normal mode and to $-380$ V to $-400$ V when a single "black" signal was detected.

The electrostatic latent image obtained was transferred onto an ordinary two-component powder developing sheet. In the image formed on the sheet, the dots had a diameter of $100\mu$, which was very close to the diameter ($80\mu$) of the main electrodes. Expansion of the image, which might otherwise be caused by negative discharge, did not take place at all. Furthermore, no missing bits were found in single-bit characters (such as a black vertical stripe) in the main scanning direction.

In addition, the image was not enlarged and no occurrence of "ghost" images was observed, even if overdischarge was caused by increasing the control electrode voltage.

As is apparent from the above-described specific example, with the use of the invention, the occurrence of missing single "black" bits or dots is eliminated, and therefore a faithfully reproduced image is obtained. Furthermore, because of the high resolution provided by the use of positive discharge, the reproduced image has a very high quality and excellent appearance.

If a voltage of magnitude $E_c+\Delta E$ were to be applied to the control electrodes at all times, when a number of contiguous "black" bits are present, overdischarge or the formation of "ghost" images would be liable to occur, thus making the operation of the device unstable. Therefore, in accordance with the invention, the voltage applied to the control electrodes is increased only in the presence of discontinuous "black" bits. Accordingly, no other elements are adversely affected.

I claim:

1. A method of applying signal voltages to an electrostatic recording multi-stylus electrode device having a multi-stylus electrode assembly of a same-plane control type or a back-plane control type composed of main electrodes and control electrodes, comprising the steps of:

detecting the presence of discontinuous "black" signals in an input video signal;

applying a normal control voltage by said control electrodes in response to non-detection of discontinuous "black" signals; and applying a control voltage higher than said normal control voltage to said control electrodes in response to detection of discontinuous "black" signals.

2. The method of applying signal voltages to an electrostatic recording multi-stylus electrode device of claim 1 wherein said control voltage is applied so as to produce a positive discharge.

3. The method of applying signal voltages to an electrostatic recording multi-stylus electrode device of claim 2 further comprising the step of applying a voltage to said main electrodes, said voltage applied to said main electrode being approximately +380 V, said normal control voltage being approximately −350 V, and said control voltage higher than said normal control voltage being approximately in a range of −380 V to −400 V.

4. An apparatus for applying signal voltages to an electrostatic recording multi-stylus electrode device of a type having a multi-stylus electrode assembly of a same-plane control type or a back-plane control type composed of main electrodes an control electrodes, circuit means for driving said main electrodes, and circuit means for driving said control electrodes with a voltage provided by a DC source, the improvement comprising:

decoding means receiving an input video signal, said decoder means producing an output signal indicative of the presence or absence of a discontinuous "black" bit signal in said video signal; and a DC source for outputting a normal voltage applied to said control electrodes in response to an output signal from said decoder being in a logic state indicative of continuous "black" signals or the absence of "black" signals in said video signal and a control voltage higher than said normal control voltage when said output signal from said decoder means indicates the presence of a continuous "black" signal in said video signal.

5. The apparatus for applying signal voltages to an electrostatic recording multi-stylus electrode device of claim 4 wherein said circuit means for driving said main electrodes and said circuit means for driving said control electrodes are connected to said main and control electrodes to produce positive discharge.

6. The apparatus for applying signal voltages to an electrostatic recording multi-stylus electrode device of claim 5 wherein said circuit means for driving said main electrodes applies a voltage of approximately +380 V to said main electrodes, said normal control voltage being approximately −350 V, and said voltage higher than said normal control voltage being approximately in a range of −380 V to −400 V.

* * * * *